(12) United States Patent
Takahashi et al.

(10) Patent No.: US 10,266,644 B2
(45) Date of Patent: Apr. 23, 2019

(54) EPOXY RESIN COMPOSITION

(71) Applicant: NISSHINBO CHEMICAL INC., Tokyo (JP)

(72) Inventors: Ikuo Takahashi, Ichihara (JP); Takahiko Itoh, Chiba (JP); Shinichi Nakashima, Chiba (JP); Takahiro Sasaki, Chiba (JP)

(73) Assignee: Nisshinbo Chemical Inc., Tokyo (JP)

( * ) Notice: Subject to any disclaimer, the term of this patent is extended or adjusted under 35 U.S.C. 154(b) by 38 days.

(21) Appl. No.: 15/563,884

(22) PCT Filed: Mar. 18, 2016

(86) PCT No.: PCT/JP2016/058776
§ 371 (c)(1),
(2) Date: Oct. 2, 2017

(87) PCT Pub. No.: WO2016/163222
PCT Pub. Date: Oct. 13, 2016

(65) Prior Publication Data
US 2018/0118878 A1 May 3, 2018

(30) Foreign Application Priority Data
Apr. 6, 2015 (JP) .................. 2015-077980

(51) Int. Cl.
*C08G 59/68* (2006.01)
*C08G 59/62* (2006.01)
*C08G 59/50* (2006.01)
*C08G 59/42* (2006.01)
*C08L 63/00* (2006.01)

(52) U.S. Cl.
CPC ......... *C08G 59/686* (2013.01); *C08G 59/621* (2013.01); *C08G 59/68* (2013.01)

(58) Field of Classification Search
None
See application file for complete search history.

(56) References Cited

U.S. PATENT DOCUMENTS

| | | | | |
|---|---|---|---|---|
| 3,884,928 A | * | 5/1975 | Bruderer | C07D 233/90 546/275.1 |
| 5,352,831 A | | 10/1994 | Flury et al. | |
| 6,172,143 B1 | * | 1/2001 | Amano | C09K 3/10 523/461 |
| 2009/0314523 A1 | | 12/2009 | Ito et al. | |
| 2018/0066098 A1 | * | 3/2018 | Takahashi | C08G 18/83 |

FOREIGN PATENT DOCUMENTS

| | | | | |
|---|---|---|---|---|
| EP | 0928825 A2 | | 7/1999 | |
| EP | 1108532 A1 | | 6/2001 | |
| EP | 1516891 A1 | | 3/2005 | |
| GB | 2247237 A | * | 2/1992 | ......... C07D 207/325 |
| JP | 5-239187 A | | 9/1993 | |
| JP | 2000290468 A | * | 10/2000 | ............ H01L 24/29 |
| JP | 2008-81727 A | | 4/2008 | |
| JP | 2011-208098 A | | 10/2011 | |
| JP | 2012-52051 A | | 3/2012 | |

OTHER PUBLICATIONS

Machine translation of JP-2000290468-A (no date).*
Extended European Search Report for European Application No. 16776391.1, dated Aug. 13, 2018.
International Search Report for PCT/JP2016/058776 (PCT/ISA/210) dated May 17, 2016.
Long et al., "Inversion symmetry and local vs. dispersive interactions in the nucleation of hydrogen bonded cyclic n-mer and tape of imidazolecarboxamidines", Beilstein Journal of Organic Chemistry, vol. 4, No. 23, 2008, pp. 1-10.

* cited by examiner

*Primary Examiner* — Michael J Feely
(74) *Attorney, Agent, or Firm* — Birch, Stewart, Kolasch & Birch, LLP

(57) ABSTRACT

The present invention provides an epoxy resin composition, which is improved in terms of storage stability without deteriorating the characteristics of a cured resin, and is also superior in handling property, by using a curing accelerator having higher latency. The epoxy resin composition of the present invention comprises an epoxy resin, a curing agent, and a curing accelerator, wherein the curing accelerator is a reaction product between a carbodiimide compound and an imidazole compound, and is contained in an amount of 0.1 to 5 parts by mass with respect to 100 parts by mass of the epoxy resin.

4 Claims, No Drawings

EPOXY RESIN COMPOSITION

TECHNICAL FIELD

The present invention relates to an epoxy resin composition to be used favorably as a semiconductor sealing material, or a laminating material for an electronic substrate.

BACKGROUND ART

An epoxy resin has the following characteristics: the mechanical strength, heat resistance, chemical resistance, adhesive property, and electrical insulating property are superior, and cure shrinkage is small. Therefore, the same is applied to various applications, such as a semiconductor sealing material, a laminating material for an electronic substrate, an insulating powder paint, an adhesive, and a carbon fiber composite material.

In an epoxy resin applied to such applications, a curing agent is used for curing, and further a curing accelerator may be occasionally used together to progress smoothly a curing reaction and shorten a processing time. A curing accelerator functions not only to accelerate a processing speed of an epoxy resin, but also to improve various physical properties of a resin, such as hardness and strength. As a curing accelerator, an imidazole compound, such as 2-ethyl-4-methylimidazole, a tertiary amine, such as diazabicycloundecene, and a phosphine, such as triphenylphosphine, are used generally.

With such a curing accelerator, the curing acceleration action develops by heating. However, for example, in the case where an epoxy resin, which is liquid at room temperature, is used, a curing reaction progresses gradually at a transport or storage temperature in a range of from room temperature to approx. 50° C. in the epoxy resin containing a curing agent and a curing accelerator, and the viscosity of the resin composition may increase 10 times as high as the initial viscosity, or even higher within a day or so. Further, in the case where a curing agent and a curing accelerator are melt-blended with a solid epoxy resin, the blend may cure as it is during transport and storage in a range of from room temperature to approx. 50° C., and its molding may become difficult.

As described above, the epoxy resin composition containing a curing accelerator has been inferior in terms of handling property and also storage stability.

To cope with the above, as a curing accelerator with improved storage stability, a microcapsuled type, in which the imidazole compound or the like is used as a core (for example, see PTL 1 and 2), a type, in which the tertiary amine is made less soluble in a form of a salt, or an imidazole compound having introduced a substituent for raising a melting point, such as 2-phenyl-4,5-di(hydroxymethyl)imidazole and 2-phenyl-4-methyl-5-(hydroxymethyl)imidazole, is utilized (for example, see PTL 3). The above are so-called high latency type curing accelerators, in which the reactivity is suppressed and its curing acceleration action is exhibited only under a predetermined condition.

CITATION LIST

Patent Literature

PTL 1: JP 2012-52051 A
PTL 2: JP 2011-208098 A
PTL 3: JP 05-239187 A

SUMMARY OF INVENTION

Technical Problem

However, even with such a high latency type curing accelerator, the handling property of an epoxy resin composition is not improved adequately and the storage stability has been still insufficient.

Therefore, it is demanded that a curing accelerator should be not only superior in reactivity, but also, especially in the case of an epoxy resin, which is liquid at room temperature, able to be stored without changing the viscosity for one day or longer between room temperature and 50° C., and additionally superior in handling property so as to maintain the fluidity for 3 hours or longer even at approx. 100 to 120° C.

The present invention was made to cope with the above problem with an object to provide an epoxy resin composition, which is improved in terms of storage stability without deteriorating the characteristics of a cured resin, and is also superior in handling property, by using a curing accelerator having higher latency.

Solution to Problem

The present invention intends to improve the storage stability of an epoxy resin composition by using a curing accelerator, in which an amino group of an imidazole compound is blocked with a carbodiimide group.

More specifically, the present invention provides the following [1] to [4].

[1] An epoxy resin composition comprising an epoxy resin, a curing agent, and a curing accelerator, wherein the curing accelerator is a reaction product between a carbodiimide compound and an imidazole compound, and is blended in an amount of 0.1 to 5 parts by mass with respect to 100 parts by mass of the epoxy resin.

[2] The epoxy resin composition according to [1] above, wherein the carbodiimide compound is an aromatic carbodiimide.

[3] The epoxy resin composition according to [1] or [2] above, wherein the imidazole compound is at least one compound selected from the group consisting of imidazole, 2-methylimidazole, 2-undecylimidazole, 2-heptadecylimidazole, 2-ethyl-4-methylimidazole, 2-phenylimidazole, 2-phenyl-4-methylimidazole, 2-phenyl-4,5-di(hydroxymethyl)imidazole, and 2-phenyl-4-methyl-5-(hydroxymethyl)imidazole.

[4] The epoxy resin composition according to any one of [1] to [3] above, wherein the curing agent comprises at least one compound out of the group consisting of a phenolic resin, an acid anhydride-based compound, and an amine-based compound.

Advantageous Effects of Invention

According to the present invention the storage stability of an epoxy resin composition can be improved without deteriorating the characteristics of a cured resin, by using a curing accelerator having higher latency.

Further, the handling property is improved in use for processing with an epoxy resin composition according to the present invention.

DESCRIPTION OF EMBODIMENTS

An epoxy resin composition according to the present invention comprises an epoxy resin, a curing agent, and a curing accelerator. In this regard, the curing accelerator is a reaction product between a carbodiimide compound and an imidazole compound.

A curing accelerator according to the present invention is intended to improve the storage stability by blocking a secondary amino group in an imidazole ring of an imidazole compound with a carbodiimide compound, so that a curing acceleration action of an epoxy resin by the imidazole compound is suppressed. In this case, in implementing a curing reaction, a carbodiimide compound, namely a blocking agent, is dissociated by heating to exhibit the curing acceleration action of the imidazole compound.

Therefore, an epoxy resin composition according to the present invention is a 1-component type epoxy resin, which is superior in storage stability before use for processing, and which curing reaction is promoted by heating during use for processing.

[Epoxy Resin]

There is no particular restriction on an epoxy resin according to the present invention, and a known epoxy resin may be used. Examples of the same include a bisphenol A type epoxy resin, a bisphenol F type epoxy resin, a phenol novolac type epoxy resin, a cresol novolac type epoxy resin, a glycidyl ester type epoxy resin, a biphenyl type epoxy resin, an alicyclic epoxy resin, a heterocyclic epoxy resin, and a liquid-rubber modified epoxy resin. The above may be used singly, or in combinations of 2 or more thereof. The epoxy resins may be selected appropriately according to an application or a purpose, and a bisphenol A type epoxy resin, a bisphenol F type epoxy resin, a phenol novolac type epoxy resin, and a cresol novolac type epoxy resin are used preferably.

[Curing Agent]

As a curing agent, a known curing agent for an epoxy resin may be used without any particular restriction. Examples thereof include a phenolic resin, an acid anhydride-based compound, and an amine-based compound. Among them, a phenolic resin may be used favorably from the viewpoint of improvement of storage stability. There is no particular restriction on a phenolic resin, and examples thereof include a bisphenol A type phenolic resin, a bisphenol F type phenolic resin, a novolac-type phenolic resin, and a resol-type phenolic resin. They may be used singly, or in combinations of 2 or more thereof.

Further, a curing agent containing polycarbodiimide, specifically polycarbodiimide modified with an aromatic heterocyclic compound such as pyrazole (but excluding imidazole), may be used favorably from the viewpoint of improvement of storage stability.

The content of a curing agent is preferably 0.5 to 2 equivalents in terms of functional groups for a curing reaction with respect to epoxy groups in an epoxy resin, and more preferably 0.8 to 1.3 equivalents from the viewpoint of improvement of storage stability, and adequate execution of a curing reaction.

In the case where the curing agent is a phenolic resin, ordinarily its content is preferably 30 to 100 parts by mass with respect to 100 parts by mass of an epoxy resin, and more preferably 40 to 70 parts by mass.

[Curing Accelerator]

A curing accelerator used according to the present invention is a reaction product between a carbodiimide compound and an imidazole compound.

(Carbodiimide Compound)

A carbodiimide compound is a compound having a carbodiimide group (—N=C=N—). The carbodiimide compound may be obtained, for example, as a condensation product of a diisocyanate.

The diisocyanate includes an aromatic diisocyanate, an aliphatic diisocyanate, an alicyclic diisocyanate, and a heterocyclic diisocyanate. Specific examples thereof include 1,5-naphthylene diisocyanate, 4,4'-diphenylmethane diisocyanate, 4,4'-diphenyldimethylmethane diisocyanate, 1,3-phenylene diisocyanate, 1,4-phenylene diisocyanate, 2,4-tolylene diisocyanate, 2,6-tolylene diisocyanate, hexamethylene diisocyanate, cyclohexane-1,4-diisocyanate, xylylene diisocyanate, isophorone diisocyanate, dicyclohexylmethane-4,4'-diisocyanate, methylcyclohexane diisocyanate, tetramethylxylylene diisocyanate, 2,5-bis(isocyanatomethyl)bicyclo[2.2.1]heptane, and 2,6-bis(isocyanatomethyl)bicyclo[2.2.1]heptane. The compounds may be used singly, or in combinations of 2 or more thereof. Among them an aromatic diisocyanate, such as diphenylmethane diisocyanate and tolylene diisocyanate, is preferable from the viewpoint of heat resistance, availability, and improvement of storage stability.

In other words, the carbodiimide compound is preferably an aromatic carbodiimide synthesized from a source material containing the aromatic diisocyanate.

Further, the carbodiimide compound is preferably polycarbodiimide from the viewpoint of easy handling, availability, solubility, etc. The polycarbodiimide is preferably an aromatic polycarbodiimide synthesized from a source material containing the aromatic diisocyanate. Further, the polycarbodiimide may be a copolymer of the aromatic polycarbodiimide with a polyether polyol, a polyester polyol, a polycarbonate polyol, a polybutadiene diol, or the like.

(Production of Carbodiimide Compound)

A carbodiimide compound can be produced by various methods using the diisocyanate as a source material. For example, a method for producing an isocyanate-terminated polycarbodiimide through condensation reaction of a diisocyanate involving carbon dioxide removal (U.S. Pat. No. 2,941,956 B, JP 47-33279 B, J. Org. Chem., 28, 2069-2075 (1963), Chemical Review, 1981, Vol. 81, No. 4, p. 619-621, etc.) may be used.

The condensation reaction of a diisocyanate should preferably be performed in the presence of a carbodiimidization catalyst. Examples of a carbodiimidization catalyst include phosphorene oxides, such as 1-phenyl-2-phosphorene-1-oxide, 3-methyl-1-phenyl-2-phosphorene-1-oxide, 1-ethyl-2-phosphorene-1-oxide, 3-methyl-2-phosphorene-1-oxide, and 3-phosphorene isomers thereof. Among them, 3-methyl-1-phenyl-2-phosphorene-1-oxide is preferable from the viewpoint of reactivity. The usage of a carbodiimidization catalyst is ordinarily from 0.1 to 1.0 parts by mass with respect to 100 parts by mass of a diisocyanate to be used for carbodiimidization.

A condensation reaction of a diisocyanate may be conducted without a solvent or in a solvent. Examples of the solvent include an alicyclic ether, such as tetrahydrofuran, 1,3-dioxane, and dioxolane; an aromatic hydrocarbon, such as benzene, toluene, xylene, and ethylbenzene; a halogenated hydrocarbon, such as chlorobenzene, dichlorobenzene, trichlorobenzene, perclene, trichloroethane, and dichloroethane; an ester-type solvent, such as ethyl acetate and butyl acetate; and a ketone-type solvent, such as methyl ethyl ketone, methyl isobutyl ketone, and cyclohexanone. They may be used singly, or in combinations of 2 or more thereof. Among them, tetrahydrofuran and cyclohexanone are preferable.

When a reaction is carried out in a solvent, the concentration of a diisocyanate is preferably from 5 to 55 mass % from the viewpoint of reaction time and yield, and more preferably from 5 to 40 mass %.

Although there is no particular restriction on the reaction temperature for a condensation reaction of a diisocyanate, it is preferably from 40 to 200° C., and more preferably from 50 to 130° C. When a reaction is carried out in a solvent, the temperature is preferably within the range of from 40° C. to the boiling point of a solvent. Further, the reaction time is preferably from 1 to 30 hours, and more preferably from 5 to 25 hours.

The degree of polymerization of a diisocyanate may be regulated by blocking isocyanate terminals through a reaction with a monofunctional compound reactive with an isocyanate group. Examples of such a compound include a monoisocyanate, such as cyclohexyl isocyanate, phenyl isocyanate, tolyl isocyanate, and isopropylphenyl isocyanate; an alcohol, such as methanol, isopropyl alcohol, phenol, and poly(ethylene glycol) monomethyl ether; an amine, such as butylamine, diethylamine, and cyclohexylamine; and a carboxylic acid, such as propionic acid and benzoic acid.

In the case where a carbodiimide compound is a polycarbodiimide, the degree of polymerization is preferably from 2 to 12, and more preferably from 2 to 9.

(Imidazole Compound)

As an imidazole compound, those having an imidazole ring with a secondary amino group may be used. Specific examples thereof include imidazole, 2-methylimidazole, 2-undecylimidazole, 2-heptadecylimidazole, 2-ethyl-4-methylimidazole, 2-phenylimidazole, 2-phenyl-4-methylimidazole, 2-phenyl-4,5-di(hydroxymethyl)imidazole, and 2-phenyl-4-methyl-5-hydroxyimidazole. They may be used singly, or in combinations of 2 or more thereof. Among them, 2-methylimidazole and 2-phenylimidazole may be used favorably, and 2-phenylimidazole is more preferable from the viewpoint of improvement of storage stability.

(Production of Curing Accelerator)

A curing accelerator according to the present invention is a product yielded by blocking a secondary amino group in an imidazole ring of an imidazole compound through a reaction with a carbodiimide compound.

For the reaction, it is preferable to add a carbodiimide compound, so that one theoretical equivalent of a carbodiimide group reacts with a secondary amino group in an imidazole ring of an imidazole compound. In practice, considering the reactivity, it is preferable to add a carbodiimide compound, so that the equivalent of reactive functional groups in the same is more than that in an imidazole compound. Although a carbodiimide compound may also function as a curing agent for an epoxy resin, when it is added to an epoxy resin in a low amount, there is no risk of curing in a short time, and therefore no influence on the storage stability.

Consequently, the amount of a carbodiimide compound to be added to an imidazole compound is preferably 1 to 2 equivalents of carbodiimide group with respect to a secondary amino group in an imidazole ring, and more preferably 1 to 1.2 equivalents.

The curing accelerator can be easily synthesized by directly mixing predetermined amounts of carbodiimide compound and imidazole compound in a state of a solution at 10 to 80° C. The synthesis reaction may be carried out without a solvent or in a solvent. Examples of the solvent include an alicyclic ether, such as tetrahydrofuran, 1,3-dioxane, and dioxolane; an aromatic hydrocarbon, such as benzene, toluene, xylene, and ethylbenzene; a halogenated hydrocarbon, such as chlorobenzene, dichlorobenzene, trichlorobenzene, perclene, trichloroethane, and dichloroethane; an ester-type solvent, such as ethyl acetate and butyl acetate; and a ketone-type solvent, such as methyl ethyl ketone, methyl isobutyl ketone, and cyclohexanone. They may be used singly, or in combinations of 2 or more thereof. Among them, tetrahydrofuran, toluene, and cyclohexanone are preferable.

The content of the curing accelerator is 0.1 to 5 parts by mass with respect to 100 parts by mass of an epoxy resin, and preferably 1 to 5 parts by mass.

When the content is less than 0.1 parts by mass, an adequate curing acceleration action cannot be obtained. Meanwhile, when the content exceeds 5 parts by mass, improvement of the storage stability of an epoxy resin composition may become hardly attainable.

[Epoxy Resin Composition]

An epoxy resin composition according to the present invention is a blend of an epoxy resin, a curing agent, and a predetermined amount of a curing accelerator as described above. The epoxy resin composition may further contain optionally a pigment, a filler, a leveling agent, a surfactant, a dispersant, a plasticizer, an ultraviolet absorber, an antioxidant, etc. according to need and to the extent that the effect of the present invention is not impaired.

An epoxy resin composition according to the present invention can be cured and shaped into various forms, such as a film form or a block form, so that processed products for materials or components of various applications may be obtained. Specifically, it may be utilized in various applications, such as a semiconductor sealing material, a laminating material for an electronic substrate, an insulating powder paint, an adhesive, and a carbon fiber composite material.

Curing and shaping of an epoxy resin composition may be performed by a known method, so that a cured resin may be obtained quickly by heating during curing. The heating temperature is preferably 120 to 200° C. from the viewpoint of a functional effect of a curing accelerator, the heat resistance of an epoxy resin, and the reactivity of a curing agent, and more preferably 150 to 180° C.

EXAMPLES

The present invention will be described in more detail below by referring to Examples. It should be noted, however, that the present invention be not restricted in any way by the Examples.

[Synthesis of Carbodiimide Compound]

(Synthesis of cb1)

Into a reactor provided with a reflux condenser and a stirrer, 75 g (0.3 mol) of 4,4'-diphenylmethane diisocyanate (hereinafter denoted as "MDI"), 14.3 g (0.12 mol) of phenyl isocyanate, 133 g of tetrahydrofuran as a solvent, and 0.75 g (0.00039 mol) of 3-methyl-1-phenyl-2-phosphorene-1-oxide as a carbodiimidization catalyst were charged, and made to react at 70° C. for 3 hours.

Through a measurement of an infrared (IR) absorption spectrum, disappearance of an absorption of an isocyanate group at a wavelength between 2200 and 2300 $cm^{-1}$ was observed, and an absorption peak near a wavelength of 2150 $cm^{-1}$ attributed to a carbodiimide group was observed to confirm that a solution of a carbodiimide compound cb1 (degree of polymerization=6) was obtained.

(Synthesis of cb2)

Into a reactor provided with a reflux condenser and a stirrer, 52.2 g (0.3 mol) of tolylene diisocyanate (mixture of 2,4-tolylene diisocyanate/2,6-tolylene diisocyanate=80/20;

hereinafter denoted as "TDI"), 14.3 g (0.12 mol) of phenyl isocyanate, 99.8 g of tetrahydrofuran as a solvent, and 0.75 g (0.00039 mol) of 3-methyl-1-phenyl-2-phosphorene-1-oxide as a carbodiimidization catalyst were charged, and made to react at 70° C. for 4 hours.

Through a measurement of an infrared (IR) absorption spectrum, disappearance of an absorption of an isocyanate group at a wavelength between 2200 and 2300 $cm^{-1}$ was observed, and an absorption peak near a wavelength of 2150 $cm^{-1}$ attributed to a carbodiimide group was observed to confirm that a solution of a carbodiimide compound cb2 (degree of polymerization=6) was obtained.

[Synthesis of Curing Accelerator]

All of imidazole compounds used in the following syntheses are products of Shikoku Chemicals Corporation. In this regard, 2PHZ-PW and 2P4MHZ-PW belong to a so-called high latency type.

(Synthesis of Curing Accelerator 2PZ-cb1)

A solution itself of the carbodiimide compound cb1 synthesized as above was added to 2-phenylimidazole (2PZ), so that a carbodiimide group reached 1 equivalent with respect to 1 equivalent of secondary amino group in an imidazole ring of 2PZ, and the mixture was made to react at 40° C. for 24 hours.

Through a measurement of an infrared (IR) absorption spectrum, substantial disappearance of an absorption peak near a wavelength of 2150 $cm^{-1}$ attributed to a carbodiimide group was observed, and an absorption peak near a wavelength of 1660 $cm^{-1}$ similar to a guanidino group ($H_2N$—(C=NH)—NH—) peak was observed to confirm that a curing accelerator 2PZ-cb1, which was a reaction product between the carbodiimide compound cb1 and 2PZ, was obtained.

(Synthesis of Curing Accelerator [2MZ-H]-cb1)

A curing accelerator [2MZ-H]-cb1, which was a reaction product between the carbodiimide compound cb1 and 2-methylimidazole (2MZ-H), was obtained identically with the synthesis of 2PZ-cb1, except that 2MZ-H was used instead of 2-phenylimidazole (2PZ).

(Synthesis of Curing Accelerator C11Z-cb1)

A curing accelerator C11Z-cb1, which was a reaction product between the carbodiimide compound cb1 and 2-undecylimidazole (C11Z), was obtained identically with the synthesis of 2PZ-cb1, except that C11Z was used instead of 2-phenylimidazole (2PZ).

(Synthesis of Curing Accelerator C17Z-cb1)

A curing accelerator C17Z-cb1, which was a reaction product between the carbodiimide compound cb1 and 2-heptadecylimidazole (C17Z), was obtained identically with the synthesis of 2PZ-cb1, except that C17Z was used instead of 2-phenylimidazole (2PZ).

(Synthesis of Curing Accelerator 2E4MZ-cb1)

A curing accelerator 2E4MZ-cb1, which was a reaction product between the carbodiimide compound cb1 and 2-ethyl-4-methylimidazole (2E4MZ), was obtained identically with the synthesis of 2PZ-cb1, except that 2E4MZ was used instead of 2-phenylimidazole (2PZ).

(Synthesis of Curing Accelerator 2P4MZ-cb1)

A curing accelerator 2P4MZ-cb1, which was a reaction product between the carbodiimide compound cb1 and 2-phenyl-4-methylimidazole (2P4MZ), was obtained identically with the synthesis of 2PZ-cb1, except that 2P4MZ was used instead of 2-phenylimidazole (2PZ).

(Synthesis of Curing Accelerator [2PHZ-PW]-cb1)

A curing accelerator [2PHZ-PW]-cb1, which was a reaction product between the carbodiimide compound cb1 and 2-phenyl-4,5-di(hydroxymethyl)imidazole (2PHZ-PW), was obtained identically with the synthesis of 2PZ-cb1, except that 2PHZ-PW was used instead of 2-phenylimidazole (2PZ).

(Synthesis of Curing Accelerator [2P4MHZ-PW]-cb1)

A curing accelerator [2P4MHZ-PW]-cb1, which was a reaction product between the carbodiimide compound cb1 and 2-phenyl-4-methyl-5-(hydroxymethyl)imidazole (2P4MHZ-PW), was obtained identically with the synthesis of 2PZ-cb1, except that 2P4MHZ-PW was used instead of 2-phenylimidazole (2PZ).

(Synthesis of Curing Accelerator 2PZ-cb2)

A curing accelerator 2PZ-cb2, which was a reaction product between the carbodiimide compound cb2 and 2PZ, was obtained identically with the synthesis of 2PZ-cb1, except that the polycarbodiimide cb2 was used instead of the carbodiimide compound cb1.

(Synthesis of Curing Accelerator 2PZ-MDI)

In a reactor provided with a reflux condenser and a stirrer, 4,4'-diphenylmethane diisocyanate (MDI) was added to 2PZ so that the isocyanate groups reached 1 equivalent with respect to 1 equivalent of secondary amino group in an imidazole ring of 2PZ, and using tetrahydrofuran as a solvent the mixture was made to react at 30° C. for 24 hours to yield a curing accelerator 2PZ-MDI, which was a reaction product between MDI and 2PZ.

(Synthesis of Curing Accelerator 2MZ-MDI)

In a reactor provided with a reflux condenser and a stirrer, 4,4'-diphenylmethane diisocyanate (MDI) was added to 2MZ so that the isocyanate groups reached 1 equivalent with respect to 1 equivalent of secondary amino group in an imidazole ring of 2MZ, and using tetrahydrofuran as a solvent the mixture was made to react at 30° C. for 24 hours to yield a curing accelerator 2MZ-MDI, which was a reaction product between MDI and 2MZ.

[Preparation of Epoxy Resin Composition (1)]

Example 1

Onto an aluminum dish, 100 parts by mass of an epoxy resin (jER828; produced by Mitsubishi Chemical Corporation), and as a curing agent 54.2 parts by mass of a phenolic resin (BRG556; produced by Showa Denko K.K.) were placed and mixed with stirring with a fluorocarbon resin rod for 1 min on a hot plate at 130° C. The curing accelerator 2PZ-cb1 synthesized above was added thereto so that the content of the imidazole compound component reached 1 part by mass, and the mixture was stirred with a fluorocarbon resin rod for 5 min on a hot plate at 50° C. to prepare an epoxy resin composition.

Examples 2 to 9

Epoxy resin compositions were prepared identically with Example 1 except that the respective curing accelerators shown in Table 1 were used.

Comparative Examples 1 to 8

Epoxy resin compositions were prepared identically with Example 1 except that solely the imidazole compounds used for syntheses of the curing accelerators were used.

Comparative Example 9

An epoxy resin composition was prepared identically with Example 1 except that the curing accelerator was changed to a microcapsule-form high latency type curing accelerator NOVACURE HX3721 (produced by Asahi Kasei E-materials Corporation).

Comparative Example 10

An epoxy resin composition was prepared identically with Example 1 except that the curing accelerator was changed to a diazabicycloundecene (DBU) salt-based and high latency type curing accelerator U-CAT SA810 (produced by San-Apro Ltd.).

Comparative Example 11

An epoxy resin composition was prepared identically with Example 1 except that the curing accelerator was changed to a DBU salt-based and high latency type curing accelerator U-CAT SA506 (produced by San-Apro Ltd.).

[Evaluation Test]

An epoxy resin composition prepared in each Example or Comparative Example was evaluated in terms of storage stability, handling property, and characteristic change of a cured resin by the following test methods.

(Storage Stability)

An aluminum dish retaining an epoxy resin composition was left standing in a drier at 50° C. The sample was taken out of the drier every 12 hours and tested (a thumb was pressed on a resin composition surface and pulled apart to sense the resistance) to measure the time required until the resin composition lost tackiness.

(Handling Property)

An aluminum dish retaining an epoxy resin composition was left standing in a drier at 100° C. The sample was taken out of the drier every 30 min and the fluidity of the resin composition was examined by tilting the aluminum dish to 45° to measure the time required until the fluidity was lost.

(Characteristic Change of Cured Resin)

The respective epoxy resin compositions immediately after preparation, after storage at 50° C. for 3 days, and after storage at 100° C. for 5 hours were left standing in a drier at 170° C. for 1 hour to yield cured resins. The glass transition temperature of each of the yielded cured resins was measured using a dynamic viscoelastometer.

The evaluation results of the Examples and the Comparative Examples are summarized in Table 1.

TABLE 1

|  |  | Curing accelerator | Content (parts by mass) | Storage stability 50° C. (days) | Handling property 100° C. (hours) | Glass transition temperature (° C.) | | |
|---|---|---|---|---|---|---|---|---|
|  |  |  |  |  |  | Immediately after preparation | 50° C. 3 days | 100° C. 5 hours |
| Example | 1 | 2PZ-cb1 | 1 | >7 | >5 | 170 | 170 | 168 |
|  | 2 | [2MZ-H]-cb1 | 1 | >7 | >5 | 168 | 168 | 167 |
|  | 3 | C11Z-cb1 | 1 | >7 | >5 | 167 | 168 | 167 |
|  | 4 | C17Z-cb1 | 1 | >7 | >5 | 165 | 167 | 167 |
|  | 5 | 2E4MZ-cb1 | 1 | >7 | >5 | 169 | 168 | 167 |
|  | 6 | 2P4MZ-cb1 | 1 | >7 | >5 | 165 | 167 | 166 |
|  | 7 | [2PHZ-PW]-cb1 | 1 | >7 | >5 | 165 | 167 | 165 |
|  | 8 | [2P4MHZ-PW]-cb1 | 1 | >7 | >5 | 170 | 168 | 167 |
|  | 9 | 2PZ-cb2 | 1 | >7 | >5 | 170 | 167 | 168 |
| Comparative Example | 1 | 2PZ | 1 | 1 | 1 | 170 | 163 | 160 |
|  | 2 | 2MZ-H | 1 | 1 | 0.5 | 165 | 165 | 166 |
|  | 3 | C11Z | 1 | 1 | 0.5 | 167 | 166 | 167 |
|  | 4 | C17Z | 1 | 1 | 0.5 | 166 | 166 | 167 |
|  | 5 | 2E4MZ | 1 | 1 | 0.5 | 168 | 168 | 167 |
|  | 6 | 2P4MZ | 1 | 1 | 0.5 | 165 | 168 | 166 |
|  | 7 | 2P4MHZ-PW | 1 | 2.5 | 1 | 160 | 161 | 159 |
|  | 8 | 2PHZ-PW | 1 | 2.5 | 1.5 | 160 | 159 | 158 |
|  | 9 | NOVACURE HX3721 | 1 | 5 | 1 | 162 | 163 | 160 |
|  | 10 | U-CAT SA810 | 1 | 1.5 | 1 | 155 | 150 | 150 |
|  | 11 | U-CAT SA506 | 1 | 5 | >5 | — | — | — |

As can be seen from the evaluation results shown in Table 1, in any of Examples 1 to 9, where a curing accelerator for an epoxy resin was a reaction product between a carbodiimide compound and an imidazole compound, the tackiness was not lost at 50° C. for 7 days or longer to confirm that the storage stability was maintained. Further, it was confirmed that the fluidity was maintained for 5 hours or longer even at 100° C. Further, when the compositions were cured after storage at 50° C. for 3 days, or after passage of 5 hours at 100° C., deterioration of the characteristics (glass transition temperature) of the cured resins was not observed.

In contrast, in any of Comparative Examples 1 to 6, where solely an imidazole compound was used as a curing accelerator, the storage stability at 50° C. could be maintained only for 1 day or shorter, and the handling property at 100° C. could be maintained only for 1 hour or shorter. Also in Comparative Examples 7 to 10, where an imidazole compound, which was a high latency type curing accelerator, was used, the storage stability and handling property were inferior to the Examples.

In Comparative Example 11, where a high latency type curing accelerator U-CAT SA506 was used, although favorable evaluation results were obtained on both the storage stability and handling property, curing at 170° C. for 1 hour was not possible.

[Preparation of Epoxy Resin Composition (2)]

Comparative Example 12

An epoxy resin composition was prepared identically with Example 1 except that the curing accelerator was changed to 2PZ-MDI.

Comparative Example 13

An epoxy resin composition was prepared identically with Example 1 except that the curing accelerator was changed to 2MZ-MDI.

Comparative Example 14

An epoxy resin composition was prepared by adding 1 part by mass of curing accelerator 2PZ and 1.4 parts by mass of a carbodiimide compound to 100 parts by mass of an epoxy resin (jER828; produced by Mitsubishi Chemical Corporation) and 54.2 parts by mass of a phenolic resin (BRG556; produced by Showa Denko K.K.) as a curing agent, followed by mixing with stirring at room temperature (25° C.).

Comparative Example 15

An epoxy resin composition was prepared by adding 1 part by mass of curing accelerator 2MZ and 1.4 parts by mass of a carbodiimide compound to 100 parts by mass of an epoxy resin (jER828; produced by Mitsubishi Chemical Corporation) and 54.2 parts by mass of a phenolic resin (BRG556; produced by Showa Denko K.K.) as a curing agent, followed by mixing with stirring at room temperature (25° C.).

With respect to Comparative Examples 12 to 15, the same evaluation tests were performed as above. The results are summarized in Table 2.

TABLE 2

|  |  | Curing accelerator | Content (parts by mass) | Storage stability 50° C. (days) | Handling property 100° C. (hours) | Glass transition temperature (° C.) | | |
|---|---|---|---|---|---|---|---|---|
|  |  |  |  |  |  | Immediately after preparation | 50° C. 3 days | 100° C. 5 hours |
| Comparative Example | 12 | 2PZ-MDI | 1 | 2.5 | 1.5 | 158 | 158 | 157 |
|  | 13 | 2MZ-MDI | 1 | 2.5 | 1 | 160 | 160 | 157 |
|  | 14 | 2PZ, cb1 mixture | 1 | 1 | 1 | 170 | 168 | 170 |
|  | 15 | 2MZ, cb1 mixture | 1 | 1 | 0.5 | 166 | 167 | 168 |

As can be seen from the evaluation results shown in Table 2, in any of Comparative Examples 12 and 13, where a curing accelerator was a reaction product between an imidazole compound and an isocyanate compound, and Comparative Examples 14 and 15, where an imidazole compound and a carbodiimide compound were added without causing a reaction between them, the storage stability and handling property were inferior.

[Preparation of Epoxy Resin Composition (3)]

Examples 10 to 18 and Comparative Examples 16 to 21

An epoxy resin composition was prepared identically with Example 1 except that a curing accelerator shown in Table 3 was used, and the content of a relevant imidazole compound component was changed to a value set forth in Table 3.

With respect to Examples 10 to 18 and Comparative Examples 16 to 21, the same evaluation tests were performed as above. The results are summarized in Table 3.

TABLE 3

|  |  | Curing accelerator | Content (parts by mass) | Storage stability 50° C. (days) | Handling property 100° C. (hours) | Glass transition temperature (° C.) | | |
|---|---|---|---|---|---|---|---|---|
|  |  |  |  |  |  | Immediately after preparation | 50° C. 3 days | 100° C. 5 hours |
| Example | 10 | 2PZ-cb1 | 0.5 | >7 | >5 | 170 | 170 | 169 |
|  | 11 | [2MZ-H]-cb1 | 0.5 | >7 | >5 | 168 | 169 | 167 |
|  | 12 | [2PHZ-PW]-cb1 | 0.5 | >7 | >5 | 165 | 166 | 166 |
|  | 13 | 2PZ-cb1 | 0.1 | >7 | >5 | 160 | 160 | 160 |
|  | 14 | [2MZ-H]-cb1 | 0.1 | >7 | >5 | 158 | 159 | 160 |
|  | 15 | [2PHZ-PW]-cb1 | 0.1 | >7 | >5 | 143 | 142 | 142 |
|  | 16 | 2PZ-cb1 | 5 | >7 | >5 | 170 | 169 | 168 |

TABLE 3-continued

|  |  | Curing accelerator | Content (parts by mass) | Storage stability 50° C. (days) | Handling property 100° C. (hours) | Glass transition temperature (° C.) | | |
|---|---|---|---|---|---|---|---|---|
|  |  |  |  |  |  | Immediately after preparation | 50° C. 3 days | 100° C. 5 hours |
|  | 17 | [2MZ-H]-cb1 | 5 | >7 | >5 | 168 | 168 | 167 |
|  | 18 | [2PHZ-PW]-cb1 | 5 | >7 | >5 | 168 | 168 | 169 |
| Comparative Example | 16 | 2PZ-cb1 | 0.01 | >7 | >5 | — | — | — |
|  | 17 | [2MZ-H]-cb1 | 0.01 | >7 | >5 | — | — | — |
|  | 18 | [2PHZ-PW]-cb1 | 0.01 | >7 | >5 | — | — | — |
|  | 19 | 2PZ-cb1 | 7 | 2.5 | 1 | 170 | 168 | 169 |
|  | 20 | [2MZ-H]-cb1 | 7 | 2.5 | 1 | 168 | 165 | 167 |
|  | 21 | [2PHZ-PW]-cb1 | 7 | 2.5 | 2 | 168 | 168 | 168 |

As can be seen from the evaluation results shown in Table 3, in any of Examples 10 to 18, where the amount of a curing accelerator added in terms of the content of an imidazole compound component was 0.1, 0.5, or 5 parts by mass with respect to 100 parts by mass of an epoxy resin, both the storage stability and the handling property were superior, and deterioration of the characteristics (glass transition temperature) of the cured resins was not observed.

In contrast, in any of Comparative Examples 16 to 18, where the content of an imidazole compound component was 0.01 parts by mass, both the storage stability and the handling property were superior, but curing at 170° C. for 1 hour was not possible. Further, in any of Comparative Examples 19 to 21, where the content of an imidazole compound component was 7 parts by mass, the storage stability and the handling property were inferior.

Meanwhile, in order to confirm the latency of the action of a curing accelerator used in the above Examples, the storage stability of an epoxy resin composition, to which only a curing accelerator was added, was evaluated. The results are shown as Reference Example and Reference Comparative Examples below.

[Preparation of Epoxy Resin Composition (4)]

Reference Example 1

In a plastic container, 100 parts by mass of an epoxy resin (jER828; produced by Mitsubishi Chemical Corporation), and the curing accelerator 2PZ-cb1 synthesized as above were placed so that the content of the imidazole compound component reached 1 part by mass, and mixed for 10 min with a planetary mixing and deaerating apparatus (MAZERUSTAR KK-400W; produced by Kurabo Industries Ltd.) to prepare an epoxy resin composition.

Reference Examples 2 to 9

Epoxy resin compositions were prepared identically with Reference Example 1 except that the respective curing accelerators shown in Table 4 were used.

Reference Comparative Examples 1 to 8

Epoxy resin compositions were prepared identically with Reference Example 1 except that solely the imidazole compounds used for syntheses of the curing accelerators were used.

Reference Comparative Example 9

An epoxy resin composition was prepared identically with Reference Example 1 except that the curing accelerator was changed to a microcapsule-form high latency type curing accelerator NOVACURE HX3721 (produced by Asahi Kasei E-materials Corporation).

Reference Comparative Example 10

An epoxy resin composition was prepared identically with Reference Example 1 except that the curing accelerator was changed to a diazabicycloundecene (DBU) salt-based and high latency type curing accelerator U-CAT SA810 (produced by San-Apro Ltd.).

[Evaluation Test]

An epoxy resin composition prepared in each Reference Example or Reference Comparative Example was evaluated in terms of storage stability by the following test method.

(Storage Stability)

Storage stability was evaluated based on a change in the glass transition temperature of each epoxy resin composition. It may be understood that the smaller temperature change means the better storage stability.

An epoxy resin composition was stored in a thermostat set at 40° C. for 21 days. The epoxy resin composition was sampled after 3, 7, 14, and 21 days, and the respective glass transition temperatures were measured. As a measuring apparatus, a differential scanning calorimeter (DSC) (produced by Seiko Instruments Inc.) was used. Approx. 20 mg of a sample was weighed out and put on an aluminum pan, which temperature was elevated from −50° C. to 150° C. at a temperature increase rate of 10° C./min to obtain a DSC curve. A glass transition temperature was determined from the obtained DSC curve as an intersection point of the extension line of the base line and the tangent line of an endothermic curve attributed to a glass transition.

In this regard, in a case where a change in a glass transition temperature was large in the Reference Comparative Examples, the measurement was discontinued before completion.

The evaluation results of the Reference Examples and the Reference Comparative Examples are summarized in Table 4.

TABLE 4

|  |  | Curing accelerator | Content (parts by mass) | Glass transition temperature (° C.) | | | | |
|---|---|---|---|---|---|---|---|---|
|  |  |  |  | 0 days | 3 days | 7 days | 14 days | 21 days |
| Reference Example | 1 | 2PZ-cb1 | 1 | −20.1 | −20.8 | −20.4 | −20.4 | −20.1 |
|  | 2 | [2MZ-H]-cb1 | 1 | −20.9 | −20.4 | −20.9 | −20.9 | −20.9 |
|  | 3 | C11Z-cb1 | 1 | −20.4 | −20.4 | −20.4 | −20.4 | −20.1 |
|  | 4 | C17Z-cb1 | 1 | −20.5 | −20.5 | −20 | −20.7 | −20.4 |
|  | 5 | 2E4MZ-cb1 | 1 | −20.4 | −20.4 | −20.6 | −20.6 | −20.2 |
|  | 6 | 2P4MZ-cb1 | 1 | −20 | −20.3 | −20.1 | −20 | −20.4 |
|  | 7 | [2PHZ-PW]-cb1 | 1 | −20.1 | −20.4 | −20 | −20.4 | −20.9 |
|  | 8 | [2P4MHZ-PW]-cb1 | 1 | −20.1 | −20.9 | −20.1 | −20.1 | −20.1 |
|  | 9 | 2PZ-cb2 | 1 | −20.5 | −20.4 | −20.4 | −20.9 | −20.4 |
| Reference Comparative Example | 1 | 2PZ | 1 | −20.5 | 10 | — | — | — |
|  | 2 | 2MZ-H | 1 | −20.1 | 47.5 | — | — | — |
|  | 3 | C11Z | 1 | −19.9 | 15.3 | — | — | — |
|  | 4 | C17Z | 1 | −20.5 | 20.4 | — | — | — |
|  | 5 | 2E4MZ | 1 | −20.8 | 34.6 | 40.2 | 55.6 | — |
|  | 6 | 2P4MZ | 1 | −20.4 | 10 | — | — | — |
|  | 7 | 2P4MHZ-PW | 1 | −20.8 | −20.5 | −10.4 | 0 | 5 |
|  | 8 | 2PHZ-PW | 1 | −20.2 | −20.4 | −15 | −4.4 | −2.8 |
|  | 9 | NOVACURE HX3721 | 1 | −20.9 | −20.2 | −11 | −6.1 | 4.2 |
|  | 10 | U-CAT SA810 | 1 | −20.3 | 12 | — | — | — |

As can be seen from the evaluation results shown in Table 4, in any of Reference Examples 1 to 9, where a reaction product between a carbodiimide compound and an imidazole compound was added as a curing accelerator to an epoxy resin composition, there was no observable change in glass transition temperature at 40° C. over 21 days to demonstrate that the storage stability was maintained.

In contrast, in any of Reference Comparative Examples 1 to 8, where solely an imidazole compound was added as a curing accelerator, as well as Reference Comparative Examples 9 and 10, where a high latency type curing accelerator was added, elevation of the glass transition temperature was observed within 21 days, and the storage stability of the epoxy resin composition was inferior to the Examples.

In this regard, it is presumed that elevation of the glass transition temperature occurred, because a curing accelerator used in Reference Comparative Examples 1 to 10 dissolved gradually in an epoxy resin, and an active site came to contact an epoxy group to advance curing of the epoxy resin.

From the above, it may be concluded that the curing accelerators used in Reference Examples 1 to 9 are curing accelerators having higher latency.

The invention claimed is:

1. An epoxy resin composition comprising an epoxy resin, a curing agent, and a curing accelerator,
    wherein the curing accelerator is a reaction product between a carbodiimide compound and an imidazole compound, and is contained in an amount of 0.1 to 5 parts by mass with respect to 100 parts by mass of the epoxy resin.

2. The epoxy resin composition according to claim 1, wherein the carbodiimide compound is an aromatic carbodiimide compound.

3. The epoxy resin composition according to claim 1, wherein the imidazole compound is at least one compound selected from the group consisting of imidazole, 2-methylimidazole, 2-undecylimidazole, 2-heptadecylimidazole, 2-ethyl-4-methylimidazole, 2-phenylimidazole, 2-phenyl-4-methylimidazole, 2-phenyl-4,5-di(hydroxymethyl)imidazole, and 2-phenyl-4-methyl-5-(hydroxymethyl)imidazole.

4. The epoxy resin composition according to claim 1, wherein the curing agent comprises at least one compound out of the group consisting of a phenolic resin, an acid anhydride-based compound, and an amine-based compound.

* * * * *